US006746116B1

(12) United States Patent
Chang

(10) Patent No.: US 6,746,116 B1
(45) Date of Patent: Jun. 8, 2004

(54) MULTI-PURPOSE GLASSES

(76) Inventor: Chun-Chuan Chang, 6 Industrial Fifth Road, Tou Chiau Industrial Park, Chiayi (TW), 621

(*) Notice: Subject to any disclaimer, the term of this patent is extended or adjusted under 35 U.S.C. 154(b) by 0 days.

(21) Appl. No.: 10/419,315

(22) Filed: Apr. 19, 2003

(51) Int. Cl.[7] .................................................. G02C 9/02
(52) U.S. Cl. .............................. 351/59; 351/60; 351/61
(58) Field of Search .............................. 351/59, 60, 61, 351/41

(56) References Cited

U.S. PATENT DOCUMENTS

| | | | |
|---|---|---|---|
| 2,752,819 A | * | 7/1956 | Krukowski .................... 351/59 |
| 6,010,215 A | | 1/2000 | Micelli ........................ 351/128 |
| 6,135,593 A | | 10/2000 | Moyse ......................... 351/41 |
| 6,439,718 B1 | | 8/2002 | Miceli et al. ................ 351/128 |
| 2002/0101561 A1 | | 8/2002 | Miceli et al. ................. 351/68 |

* cited by examiner

Primary Examiner—Hung X. Dang

(57) ABSTRACT

A pair of multi-purpose glasses includes a frame body having a bridge portion, two side portions at opposite ends of the bridge portion respectively, two temples pivotally secured to the frame body at distal ends of the side portions respectively, and two movable lenses on the frame body. The glasses allow eyes to see through the lenses, or the lenses can be moved away from vision lines of at least one of the eyes. The lenses can be positioned at two sides of the frame body to serve as a pair of normal glasses. Alternative, each lens can be moved away from one eye to be positioned on the other side of the frame. The glasses can then serve, for example, as a pair of cosmetic glasses, or for applying eye drops.

6 Claims, 4 Drawing Sheets

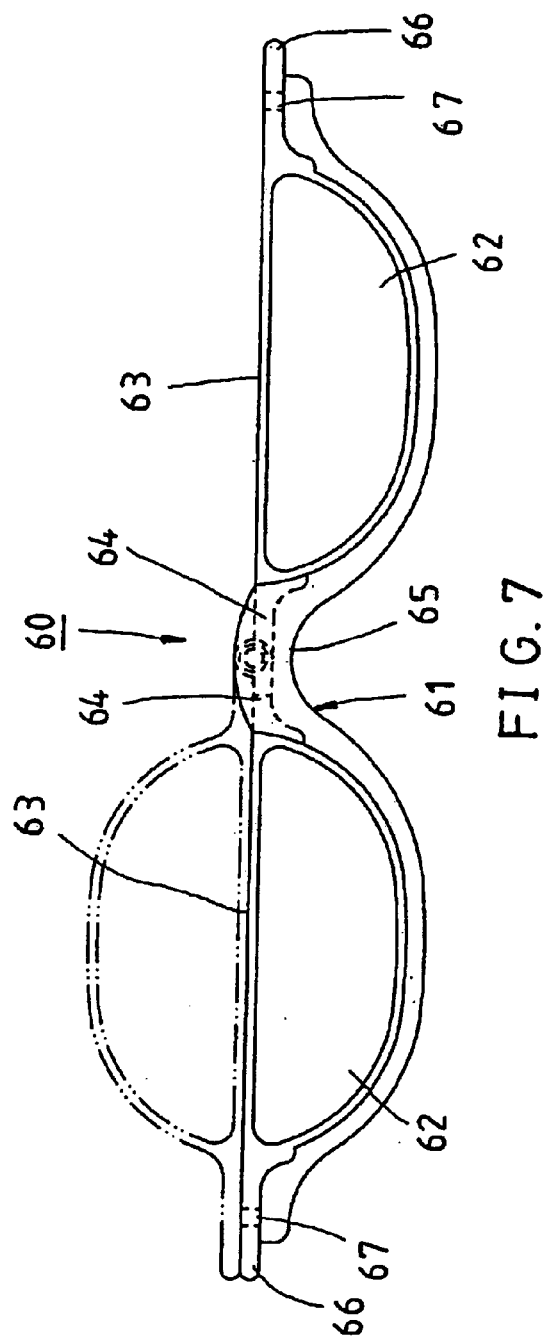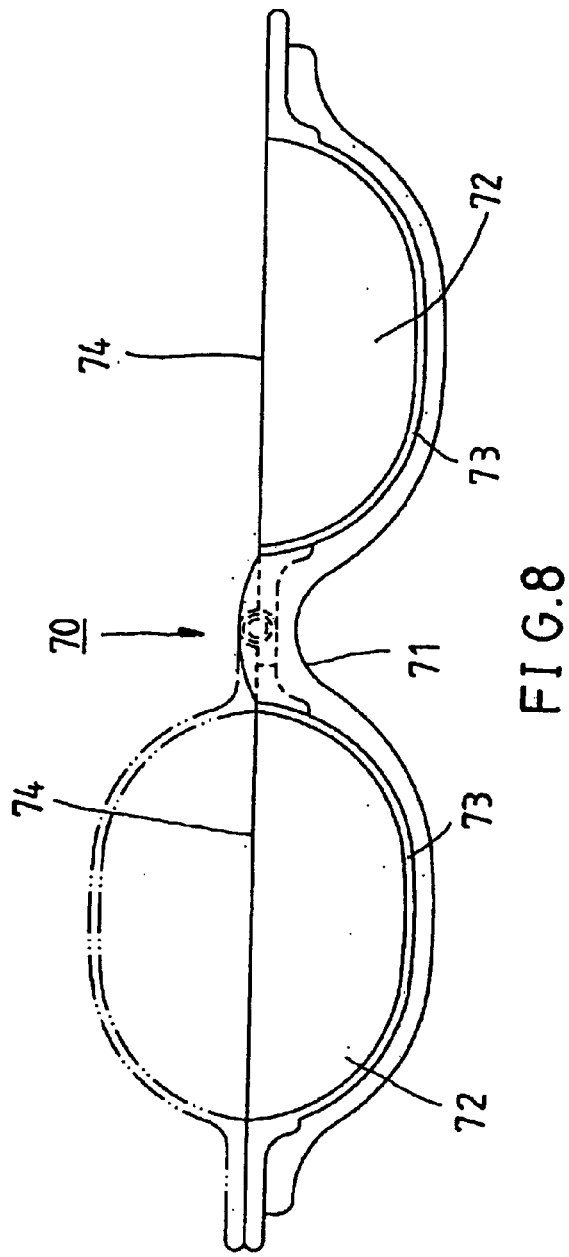

MULTI-PURPOSE GLASSES

BACKGROUND OF THE INVENTION

1. Field of the Invention

The present invention relates generally to glasses, and more particularly to multi-purpose glasses.

2. Description of the Related Art

Typically a person has to take off her glasses to put on eye shadow. But, with her glasses off, she might have difficulty clearly seeing her face in a mirror to apply the make-up.

FIG. 1 shows conventional glasses 10 for one to wear while applying make-up. It is commonly known as "cosmetic glasses". The glasses 10 only have one lens 12 that can be pivoted on a frame body 14. One can wear cosmetic glasses 10 and switch the lens 12 around to apply make-up on the exposed eye.

The cosmetic glasses shown in FIG. 1 are not applicable in everyday normal use. In other words, if a lady is nearsighted and prefers seeing where she is applying her eye shadow, she needs two pairs of glasses-one for normal everyday use, and the other for cosmetic use. Not only would this tend to lead to additional expenses, she also has to deal with storing two pairs of glasses and switching glasses for different applications.

SUMMARY OF THE INVENTION

One of the main objectives of the present invention is to provide a pair of multi-purpose glasses. Instead of owning two pairs of glasses, one for normal use, and the other for, as an example, cosmetic use, a user only needs one pair of the multi-purpose glasses. This should be more convenient for the user, both in terms of storage and usage.

In one embodiment, a pair of multi-purpose glasses includes a frame body having a bridge portion and two side portions at opposite ends of the bridge portion respectively; two temples, each pivotally secured to one end of one of the side portions; and two movable lenses, each being able to be rotated at the bridge portion. During normal everyday use, each lens would be generally located in or coupled to one of the side portions. During cosmetic or other applications, each lens can be rotated to the opposite side so that both lenses would be coupled to one side portion of the frame. This would allow exposing the eye at the other side portion of the frame. Through this embodiment, one pair of glasses can serve multiple purposes.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 7 is a front view of a second embodiment of the present invention; and

FIG. 8 is a front view of a third embodiment of the present invention.

Same numerals in FIGS. 1–8 are assigned to similar elements in all the figures. Embodiments of the invention are discussed below with reference to FIGS. 1–8. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
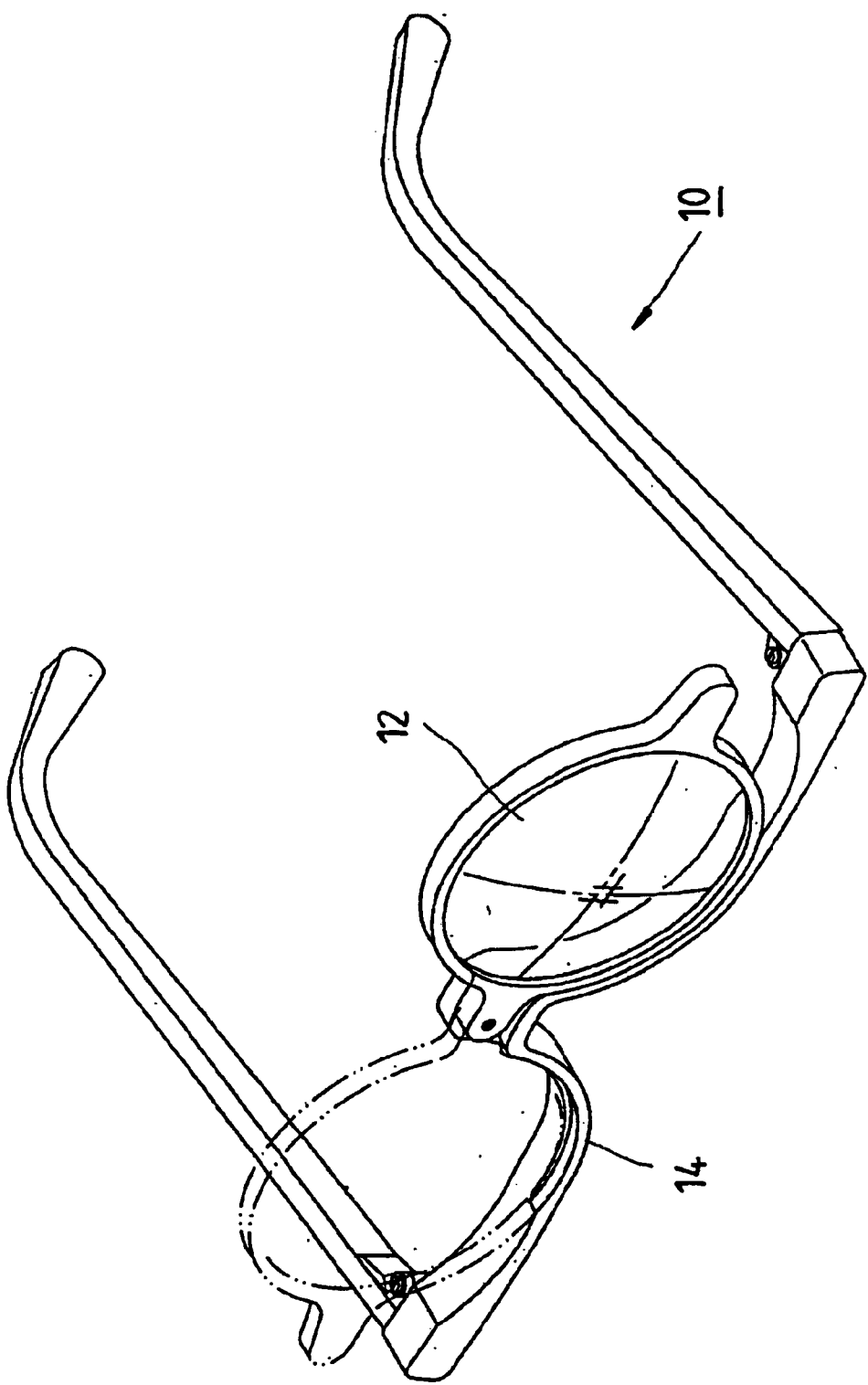
FIG. 1 is a perspective view of a pair of conventional cosmetic glasses.
Figure 2:
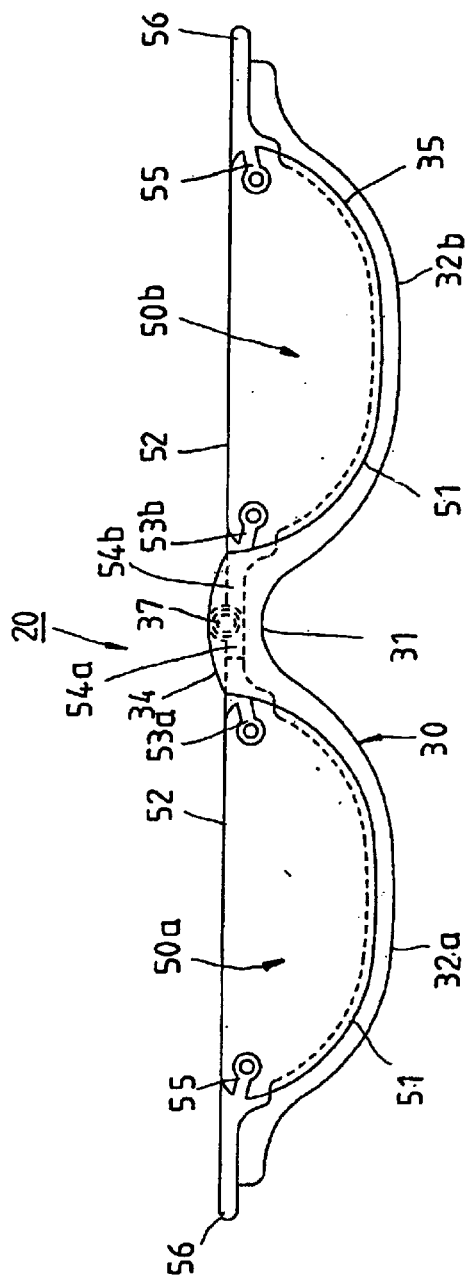
FIG. 2 is a front view of a first embodiment of the present invention, showing two lenses, one on a left and the other on a right side of a frame body respectively.
Figure 3:
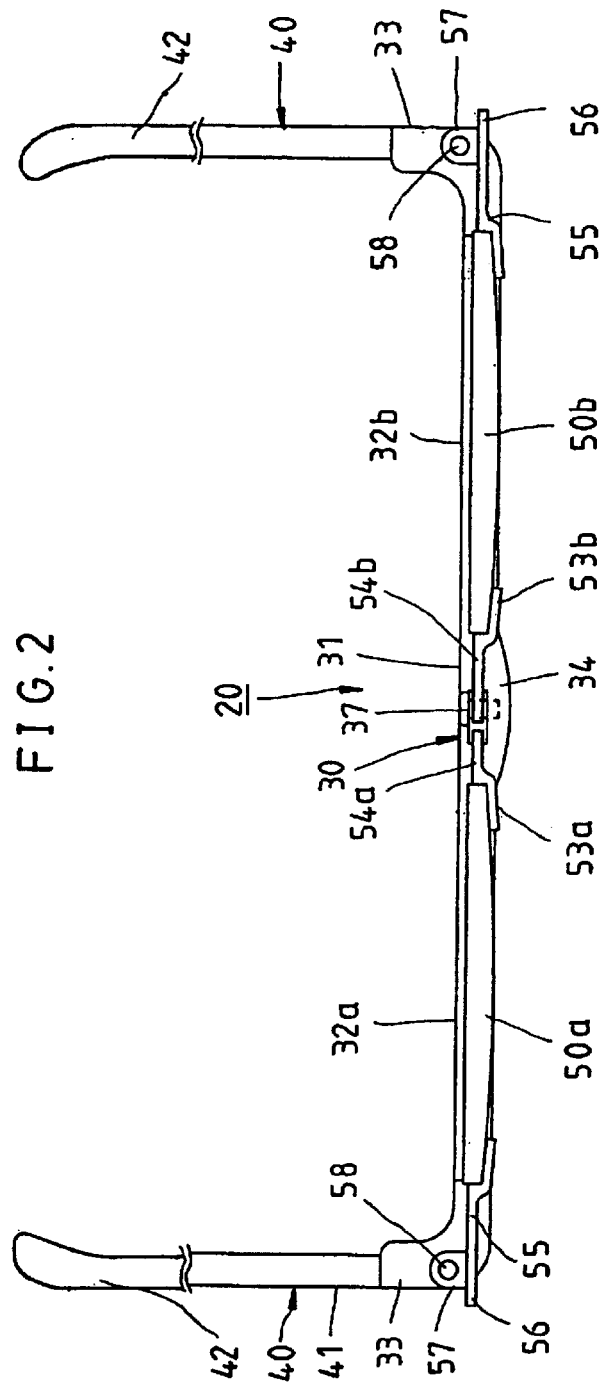
FIG. 3 is a top view of FIG. 2.

FIG. 2 and FIG. 3 show one embodiment of the present invention. It includes a pair of multi-purpose glasses 20, which comprises a frame body 30, two temples 40 pivotally secured to two ends of the frame body 30, and two lenses 50a and 50b pivoted on the frame body 30.

The frame body 30 includes a bridge portion 31, two side portions 32a and 32b at opposite ends of the bridge portion 31. Each side portion includes two hinge portions 33. The bridge portion 31 of the frame body 30 is a curved-downward bar in the front view of the glasses 20 to allow the bridge to stand on a user's nose. The bridge portion 31 can mount two nose pads (not shown in the figures). The bridge portion 31 has a pivoting board 34. The side portions 32a and 32b are connected to the bridge portion 31, each of which includes a downward curvature in the front view to form a space 35. The space can be an elliptical receiving space. The side portions 32a and 32b are in the general vicinity of the user's eyes when he wears the glasses 20. The hinge portions 33 are respectively extruded backward to the temples for suitable lengths.

The temples 40, each of which has a front end 41 and a rear end 42, are respectively pivotally secured to the side portions 32a and 32b of the frame body 30. The temples 40 pivot the front ends 41 on the hinge portions 33 respectively and can be curved downward at portions adjacent to the rear ends 42 thereof. The temples 40 serve similar functions as temples of conventional glasses. The curved portions of the temples 40 can rest on the user's ears when they are extended. The temples 40 also can be folded to reduce the size of the glasses 20 for storing.

The lenses 50a and 50b can be substantially semi-elliptical and have shapes corresponding to the receiving spaces 35 of the side portions 32a and 32b respectively. Each of the lenses 50a and 50b has a curved edge portion 51 to be coupled to, or positioned against, the side portions 32a or 32b, and a flat edge portion 52 at a side opposite from the curved edge portion 51.

Each lens 50a and 50b is attached to a hinge device 53a and 53b in the general vicinity of the bridge portion 31. Each hinge device 53a and 53b has a pivoting portion 54a and 54b at a distal end thereof. The lenses 50a and 50b can be pivoted on the pivoting board 34 of the bridge portion 31 via a rod 37 running through holes (not labeled) on the pivoting portions 54a and 54b. The rod 37 is attached to a rear side of the pivoting board 34 such that the lenses 50a and 50b can be rotated with the rod 37 serving as the axis.

As shown in FIG. 2, the lenses 50a and 50b can rest in the receiving spaces 35 of the side portions 32a and 32b respectively such that the glasses 20 can serve as a pair of normal glasses for everyday use.

Figure 4:
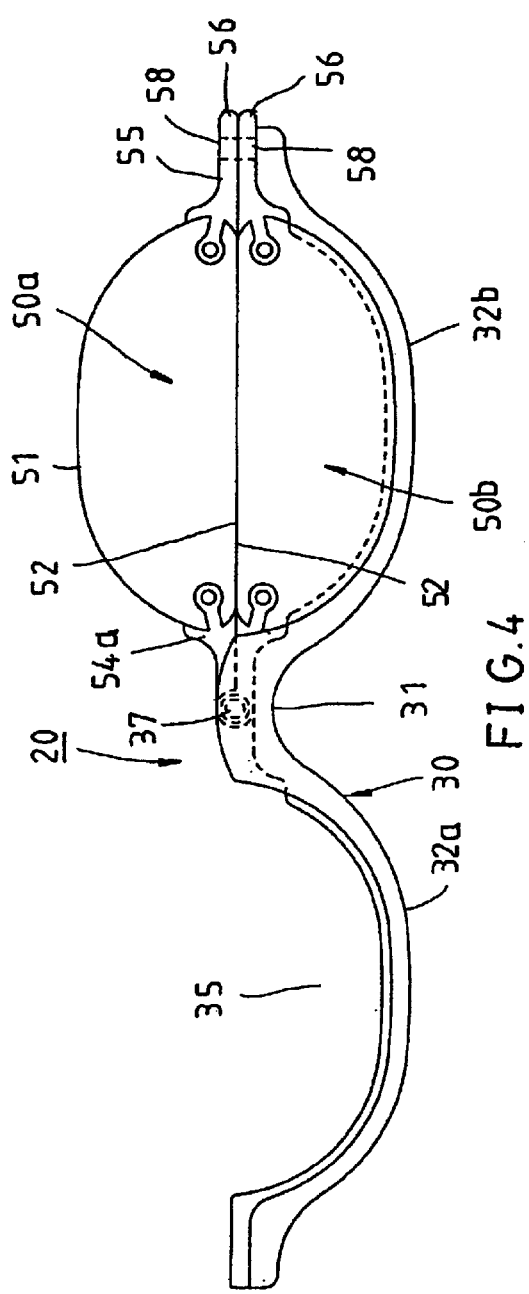
FIG. 4 is a front view of the first embodiment of the present invention, showing both lenses on the right side of the frame body if viewed from the front.
Figure 5:
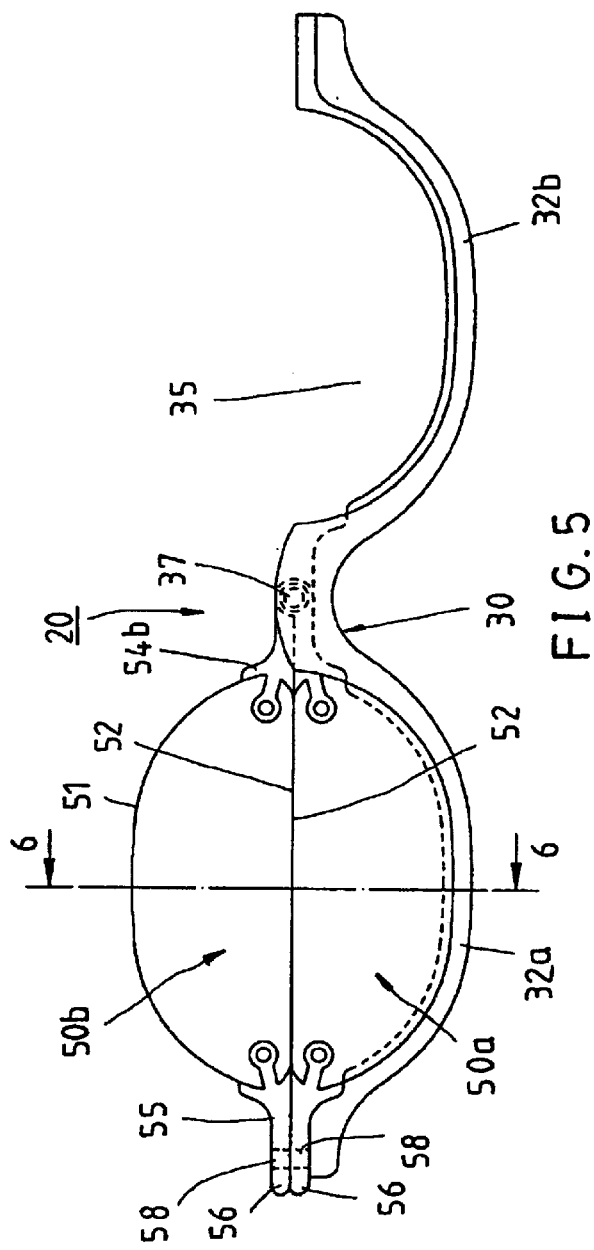
FIG. 5 is a front view of the first embodiment of the present invention, showing both lenses on the left side of the frame body if viewed from the front.

The right lens 50a can be turned counterclockwise to the left side of the bridge portion 31 and rests its flat edge portion on the flat edge portion of the left lens 50b as shown in FIG. 5. Similarly, the left lens 50b can be turned clockwise to the right side of the bridge portion 31 and rests its flat edge portion on the flat edge portion 52 of the right lens 50a as shown in FIG. 4. Under such conditions, the glasses 20 of the present invention can serve, for example, as a pair of cosmetic glasses.

Figure 6:
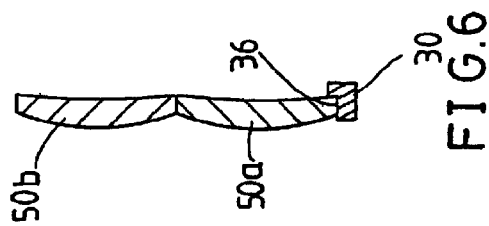
FIG. 6 is a sectional view along the 6—6 line in FIG. 5.

FIG. 6 shows both of the lenses 50a and 50b on the side portion 32a at the left side of the bridge portion 31. The curved edge 51 of the lens 50a is rested in a recess 36 of the side portion 32a. The recess 36 has a wall at its rear side that can prevent the lens 50a from biasing toward the user's face. Similarly, the side portion 32b at the right side of the bridge portion 31 can receive the curved edge 51 of the lens 50b.

Each lens 50a and 50b also includes a switching device 55 at a distal end, generally opposite from the hinge device 53a or 53b respectively. Each switching device 55 has a holding portion 56 projected outwardly from a distal end of the flat edge portion 52 of the lens 50a or 50b. A distal end of the holding portion 56 extends beyond the side portions 32a and 32b. The extension facilitates a user to grip the holding portions 56 of the switching devices 55, and to rotate the lenses 50a and 50b. When both lenses 50a and 50b are on the same side, as shown, for example in FIG. 4 and FIG. 5, the holding portions 56 of the switching devices 55 are stacked together. In one embodiment, the holding portions 56 have round distal ends so that it is easier to grip just one of them or both of them at a time, and to rotate the corresponding lens or lenses.

In the present embodiment, each switching device 55 can have a lug portion 57, as shown in FIG. 3, each lug portion having a magnetic device 58. The magnetic device 58 on the lug portion 57 of each of the switching devices 55 can be one or more magnets to provide magnetic attraction force when the devices are stacked together. In another example, one magnetic device is a magnet on the lug portion of one of the switching device, while the other magnetic device is a metal that can be attracted to a magnet. With the magnetic devices 58, the lenses 50a and 50b can be better positioned when they are stacked. There can also be a magnetizable material, such as a metal or a magnet, at a hinge portion to help attach a lens to that side portion. This attachment can be through the magnetic device of the corresponding lug portion.

In use, the glasses 20 can serve as a pair of normal glasses when the lenses 50a and 50b rest in, or couple to, the receiving spaces 35 of the side portions 32a and 32b respectively as in FIG. 2. The left lens 50a can be rotated to the right side portion 32b and stacked on, or coupled to, the right lens 50b as shown in FIG. 4. Or the right lens 50b can be rotated to the left side portion 32a and stacked on, or coupled to, the left lens 50a as shown in FIG. 5. Under such circumstance, the glasses 20 can serve as a pair of cosmetic glasses allowing a user to put on make-up, while wearing the glasses.

In another embodiment, the side portions of the frame body are on the top as opposed to the side portions shown in FIG. 2 being on the bottom. In other words, the side portions instead of having downward curvatures, have upward curvatures. In this embodiment, the lenses are rotated from the bottom. The lenses can be held by magnetic forces or hinges.

The way of pivoting the lenses on the frame body is not limited to the hinge devices. Other way can achieve similar functions as long as they can allow the lenses to pivot on the frame body and to be switched to different sides of the frame.

FIG. 7 shows a pair of multi-purpose glasses 60 of the second embodiment of the present invention. It comprises a frame body 61 having a bridge portion 65, two temples (not shown) and two lenses 62, each being able to be rotated at the bridge portion 65. Each lens 62 is provided with an annular lens rim 63 covering all the edges of the lens 62. Each lens rim 63 projects a hinge device 64 at an end in the vicinity of the bridge portion, and a switching device 66 at another end, which is generally away from the bridge, in the vicinity of a temple. Each hinge device 64 is pivoted on the bridge portion 65 of the frame body 61. Each switching device 66 can include a magnetic device 67.

The glasses 20 of the first embodiment are similar to a pair of rimless glasses and the glasses 60 of the second embodiment are similar to a pair of full-rim type glasses.

FIG. 8 shows a pair of multi-purpose glasses 70 of the third embodiment of the present invention, which can be called a pair of semi-rim type glasses. It comprises a frame body 71 with two side portions, two temples (not shown), a bridge portion and two lenses 72. Each lens 72 is provided a semi-annular lens rim 73 at a bottom thereof so that the lens 72 has a flat edge portion at an exposed top. Again the lenses can be rotated from one side portion to another side portion of the frame.

A number of embodiments have been described for cosmetic uses. However, the present invention is also applicable for other purposes. For example, the present invention is applicable for people to apply eye drops to reduce eye inflammation, eyestrain or other eye irritation. Under this condition, the lens over the eye that requires eye drops would be rotated to expose it for eye-drop application.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A pair of multi-purpose glasses, comprising:
   a frame body having a bridge portion and two side portions at opposite ends of said bridge portion respectively;
   two temples pivotally secured to said frame body at distal ends of said side portions respectively;
   two lenses movably provided on said frame body for eyes to see through them and both lenses being able to be outside of vision lines of the eyes independently by moving the corresponding lens elsewhere,
   wherein each lens has a pivoting portion that is pivoted on said bridge portion of said frame body, and
   each lens can be turned to a top of said side portion or turned to another side of said bridge portion to be stacked on a top of another lens.

2. A pair of multi-purpose glasses, comprising:
   a frame body having a bridge portion and two side portions at opposite ends of said bridge portion respectively;
   two temples pivotally secured to said frame body at distal ends of said side portions respectively;
   two lenses movably provided on said frame body for eyes to see through them and both lenses being able to be outside of vision lines of the eyes independently by moving the corresponding lens elsewhere,
   wherein each lens has a pivoting portion that is pivoted on said bridge portion of said frame body, and each lens has a flat edge portion and said flat edge portions are against each other when both of said lenses are turned to one side.

3. The multi-purpose glasses as defined in claim 2, wherein said flat edge portions are at tops of said lenses when said lenses rest on each of said side portions respectively.

4. A pair of multi-purpose glasses, comprising:

a frame body having a bridge portion and two side portions at opposite ends of said bridge portion respectively;

two temples pivotally secured to said frame body at distal ends of said side portions respectively;

two lenses movably provided on said frame body for eyes to see through them and both lenses being able to be outside of vision lines of the eyes independently by moving the corresponding lens elsewhere, wherein each lens has a pivoting portion that is pivoted on said bridge portion of said frame body, wherein each lens is provided with a switching device, which has a holding portion projected outwardly, and wherein said switching devices are respectively provided with a magnetic device to provide magnetic attraction force when they are closed.

5. A pair of multi-purpose glasses, comprising:

a frame body having a bridge portion and two side portions at opposite ends of said bridge portion respectively;

two temples pivotally secured to said frame body at distal ends of said side portions respectively;

two lenses movably provided on said frame body for eyes to see through them and both lenses being able to be outside of vision lines of the eyes independently by moving the corresponding lens elsewhere, wherein each lens has a pivoting portion that is pivoted on said bridge portion of said frame body, wherein each lens is provided an annular lens rim covering all of the edges of said lens, and each pivoting portion is fixed on one of said lens rims, and wherein said lens rims are respectively provided with a magnetic device to provide magnetic attraction force when they are closed.

6. A pair of multi-purpose glasses, comprising:

a frame body having a bridge portion and two side portions at opposite ends of said bridge portion respectively;

two temples pivotally secured to said frame body at distal ends of said side portions respectively;

two lenses movably provided on said frame body for eyes to see through them and both lenses being able to be outside of vision lines of the eyes independently by moving the corresponding lens elsewhere, wherein each lens has a pivoting portion that is pivoted on said bridge portion of said frame body, wherein each lens is provided an annular lens rim, the lens rims covering parts of the edges of said lenses, and wherein said lens rims are respectively provided with a magnetic device to provide magnetic force when they are closed.

* * * * *